(12) United States Patent
Pasqualotto

(10) Patent No.: US 11,479,928 B2
(45) Date of Patent: Oct. 25, 2022

(54) SCREED ACCESSORY FOR LEVELLING UNCURED CONCRETE SURFACES

(71) Applicant: Robert Pasqualotto, London (GB)

(72) Inventor: Robert Pasqualotto, London (GB)

(*) Notice: Subject to any disclaimer, the term of this patent is extended or adjusted under 35 U.S.C. 154(b) by 111 days.

(21) Appl. No.: 16/962,204

(22) PCT Filed: Jan. 15, 2019

(86) PCT No.: PCT/GB2019/050107
§ 371 (c)(1),
(2) Date: Jul. 14, 2020

(87) PCT Pub. No.: WO2019/138257
PCT Pub. Date: Jul. 18, 2019

(65) Prior Publication Data
US 2021/0062438 A1     Mar. 4, 2021

(30) Foreign Application Priority Data

Jan. 15, 2018  (GB) ..................................... 1800599

(51) Int. Cl.
*E01C 19/42*     (2006.01)
*E01C 19/26*     (2006.01)
(Continued)

(52) U.S. Cl.
CPC ............ *E01C 19/42* (2013.01); *E01C 19/266* (2013.01); *E01C 19/288* (2013.01); *E01C 19/40* (2013.01);
(Continued)

(58) Field of Classification Search
CPC ...... E01C 19/266; E01C 19/288; E01C 19/40; E01C 19/405; E01C 19/42; E04F 21/241; E04F 21/242; F16B 2/20
(Continued)

(56) References Cited

U.S. PATENT DOCUMENTS 3,901,618 A     8/1975  Sant'Agata
4,253,793 A  *  3/1981  Braml ................... E02F 3/3618
                                             172/273
(Continued)

FOREIGN PATENT DOCUMENTS

CA    02316153   *  8/2008  ............... E02T 3/36
CA    2657169 A1     8/2010
(Continued)

OTHER PUBLICATIONS

International Search Report and Written Opinion dated Mar. 22, 2019 in connection with corresponding International Application No. PCT/GB2019/050107.

*Primary Examiner* — Raymond W Addie
(74) *Attorney, Agent, or Firm* — Stout, Uxa & Buyan, LLP; Donald E. Stout

(57) ABSTRACT

An accessory for levelling uncured concrete surfaces. The accessory includes a screed head with two height adjusting levelling cylinders (1), a slope cylinder (2), a coupling component (3), a blade (4), an auger (5), a roller (6), a vibrator (7) and a sprinkler system (8). The coupling component (3) includes a hand operated hinged latch with a hook able to be snapped in place in a single movement so as to pinch together the coupling component and a telescopic boom of a general-purpose vehicle. The slope cylinder (2) enables the screed head to be maintained continuously at ninety degrees to the horizontal.

20 Claims, 9 Drawing Sheets

(51) Int. Cl.
*E01C 19/28* (2006.01)
*E01C 19/40* (2006.01)
*F16B 2/20* (2006.01)
*E04F 21/24* (2006.01)

(52) U.S. Cl.
CPC .............. *E01C 19/405* (2013.01); *F16B 2/20* (2013.01); *E04F 21/241* (2013.01); *E04F 21/242* (2013.01)

(58) Field of Classification Search
USPC ................................................ 404/101, 118
See application file for complete search history.

(56) References Cited

U.S. PATENT DOCUMENTS

| | | | | | |
|---|---|---|---|---|---|
| 4,930,935 | A | * | 6/1990 | Quenzi | E01C 19/006 404/114 |
| 5,039,249 | A | * | 8/1991 | Hansen | E04F 21/242 404/84.5 |
| 5,224,793 | A | * | 7/1993 | De Pol | E01C 19/15 404/114 |
| 6,098,321 | A | * | 8/2000 | Logan | E02F 3/401 37/403 |
| 6,439,393 | B1 | * | 8/2002 | Zeller | B07B 1/00 209/405 |
| 6,447,204 | B1 | * | 9/2002 | McDonald | E01C 19/405 404/118 |
| 6,860,676 | B2 | * | 3/2005 | Pont Feixes | E04F 21/247 404/118 |
| 7,108,450 | B2 | * | 9/2006 | Grubba | E01C 19/187 404/101 |
| 7,458,747 | B2 | * | 12/2008 | Musil | E01C 19/185 404/101 |
| 7,946,063 | B2 | * | 5/2011 | Paull | E01C 19/187 37/407 |
| 8,152,409 | B1 | * | 4/2012 | Ligman | E01C 19/405 404/118 |
| 8,322,947 | B2 | * | 12/2012 | Neumann | E01C 19/2045 404/104 |
| 8,678,702 | B1 | * | 3/2014 | De Jong | E01C 19/15 404/85 |
| 9,297,171 | B1 | * | 3/2016 | Ligman | E04F 21/241 |
| 9,945,093 | B1 | * | 4/2018 | Belliveau | E02F 3/3622 |
| 2003/0108390 | A1 | * | 6/2003 | Carlson | E01C 19/4833 404/118 |
| 2005/0141963 | A1 | * | 6/2005 | Holmes | E01C 19/405 404/118 |
| 2005/0163565 | A1 | * | 7/2005 | Quenzi | E01C 19/185 404/84.1 |
| 2006/0008323 | A1 | * | 1/2006 | Torvinen | E01C 19/006 404/75 |
| 2006/0120801 | A1 | | 6/2006 | Johnson | |
| 2009/0092444 | A1 | * | 4/2009 | Schoen | E01C 19/405 404/118 |
| 2010/0196096 | A1 | * | 8/2010 | Halonen | E01C 19/405 404/84.1 |
| 2011/0002736 | A1 | * | 1/2011 | Monger | E01C 19/48 404/75 |
| 2018/0080184 | A1 | * | 3/2018 | Pietila | E02F 3/815 |
| 2019/0136485 | A1 | * | 5/2019 | Pratt | E02F 3/3627 |

FOREIGN PATENT DOCUMENTS

| | | | |
|---|---|---|---|
| CN | 102094379 B | 10/2012 | |
| CN | 203603006 U | 5/2014 | |
| CN | 104894949 A | 9/2015 | |
| GB | 2333760 | * 12/1998 | ................ E02T 3/36 |

\* cited by examiner

SCREED ACCESSORY FOR LEVELLING UNCURED CONCRETE SURFACES

FIELD OF THE INVENTION

The present invention relates to a detachable stand-alone accessory for the levelling of surfaces relating particularly but not exclusively to the field of uncured concrete laying and levelling.

BACKGROUND

Traditional machinery used for the levelling of uncured concrete is costly and can weigh several thousand kilograms and require considerable storage space. The present invention adapts aspects of the larger machinery to create a compact, lightweight attachable and detachable accessory for general purpose machines.

Most large levelling machines available in today's market for high production are purpose built full-sized driveable vehicles equipped with a boom or telescopic armature deploying several adjacent and parallel horizontally mounted components typically consisting of an auger screw part for lateral spreading of uncured material, a blade and a vibration plate for final smoothing of the uncured surface.

By comparison to the present-day machinery the compact accessory described herein consists substantially of the Screed Head component part of such machines only, but with several improvements and innovations. For example, as with traditional machines elevation is continually adjusted by two hydraulic cylinders receiving electronic signals from laser receivers, as is common to the art. However, the present accessory invention features a more efficient single centre-mounted hydraulic cylinder able to continuously maintain the screed head at ninety degrees to the horizontal.

Cheaper hand operated concrete levelling tools are available but require a much greater deployment of labour. Such methods do not match the quality of finish available from the machinery described here but the cost of such equipment may be prohibitive for the smaller contractor whose throughput of concrete levelling work may not justify the cost of investment in a full size four-wheel levelling machine.

There exists therefore a strong commercial case for an intermediate device by way of an accessory possessing key component parts of the screed head section of the traditional machine and being attachable to general purpose machines or other vehicles already in the smaller contractor's inventory.

According to an aspect of the invention, there is provided an accessory for levelling uncured concrete surfaces, the accessory comprising a screed head with a blade and a coupling component for detachably coupling fixedly to a telescopic boom of a general-purpose vehicle.

In some embodiments, the accessory may comprise a slope cylinder, for example for continuously maintaining the screed head at ninety degrees to the horizontal. The slope cylinder may be a single hydraulic cylinder. The slope cylinder may be centre-mounted. The slope cylinder may be a single centre-mounted hydraulic cylinder.

In some embodiments, the accessory may comprise laser receivers. The slope cylinder may be operable to accurately control and/or maintain the screed head, in use, at a working angle of ninety degrees to the horizontal, for example in response to data supplied by laser receivers.

In some embodiments, the accessory may comprise a frame and/or a working head. The slope cylinder may sit atop the frame, e.g. and may thereby be separate from the working head. The working head may comprise the blade.

In some embodiments, the accessory may comprise a main housing, e.g. for the blade. The screed head may comprise a main body. The main body may comprise the frame (where provided). The slope cylinder may be positioned on the main body, for example such that, when the main housing is moved by the slope cylinder, the frame remains immovable relative to a telescopic boom of a general-purpose vehicle to which the accessory is fixedly coupled.

In some embodiments, the accessory may comprise levelling cylinders, e.g. height adjusting levelling cylinders.

In some embodiments, the accessory may comprise laser receivers. The height adjusting levelling cylinders (where provided) may comprise two hydraulic cylinders, e.g. for continually adjusting elevation (for example based on received electronic signals from the laser receivers).

In some embodiments, the coupling component may be configured to be hooked to a telescopic boom of a general-purpose vehicle.

In some embodiments, the coupling component may comprise one or more latches, e.g. one or more hinged latches.

In some embodiments, the coupling component may comprise a hand operated hinged latch, for example with a hook. The hook may be able to be snapped in place in a single movement, e.g. so as to pinch together the coupling component and the edge of, any or all sides or places on the periphery of, and/or the end of a telescopic boom of a general-purpose vehicle (for example in order to increase the rigidity of the connection).

In some embodiments, the coupling component may comprise side-facing and/or forward-facing lugs, for example with holes for the fixing of bolts in a variety of places (e.g. to gain added rigidity of the connection between the accessory and a telescopic boom of a general-purpose vehicle).

In some embodiments, the accessory may comprise one or more of an auger, a roller, a vibrator and a sprinkler system.

According to an aspect of the invention, there is provided an accessory for the levelling of uncured concrete, sand, soil or any other moist slurry able to be rapidly attached to and detached from a general-purpose vehicle.

In some embodiments, the accessory may comprise or include levelling cylinders, e.g. height adjusting levelling cylinders.

In some embodiments, the accessory may comprise or be equipped with a slope cylinder.

In some embodiments, the accessory may comprise a screed head main body. In embodiments, the accessory may comprise a main housing, for example for the auger, blade, roller and/or vibrator. In embodiments, the accessory may comprise a frame section or frame.

In some embodiments, the slope cylinder (where provided) may be positioned on the screed head main body. The slope cylinder may be positioned on the screed head main body such that only the main housing (where provided) for the auger, blade, roller and vibrator is moved by the slope cylinder, e.g. whilst the frame section or frame (where provided) of the accessory remains immovable in relation the vehicle's boom.

In some embodiments, the accessory may comprise or be equipped with one or more of a blade, a coupling component, an auger, a roller, a vibrator and/or a sprinkler system.

According to an aspect of the invention there is provided a coupling component for use in an accessory as described herein. The coupling component may comprise bolt holes in a multiplicity of places for added rigidity of the link with the vehicle armature.

In embodiments, the coupling component may comprise or be equipped with side-facing and/or forward-facing lugs, for example with holes for the fixing of bolts in a variety of places (e.g. to gain added rigidity to the connection between the levelling accessory and the vehicle armature or boom, for example to which it is attached or attachable).

In some embodiments, the coupling component may comprise or be equipped with a latch, (e.g. a hinged latch), for example which may be hand operated or operable. The latch may comprise or have a hook, e.g. able to be snapped in place in a single movement (for example so as to pinch together the coupling component and a portion of the boom or armature of a general-purpose vehicle, e.g. the edge of, any or all sides or places on the periphery of, and/or the end of the or a vehicle's (e.g. general-purpose vehicle's) armature or boom, so as to increase the rigidity of the connection).

Aspects and advantages of the present invention will become apparent upon reading the following detailed description and upon reference to the following drawings.

Figure 1:
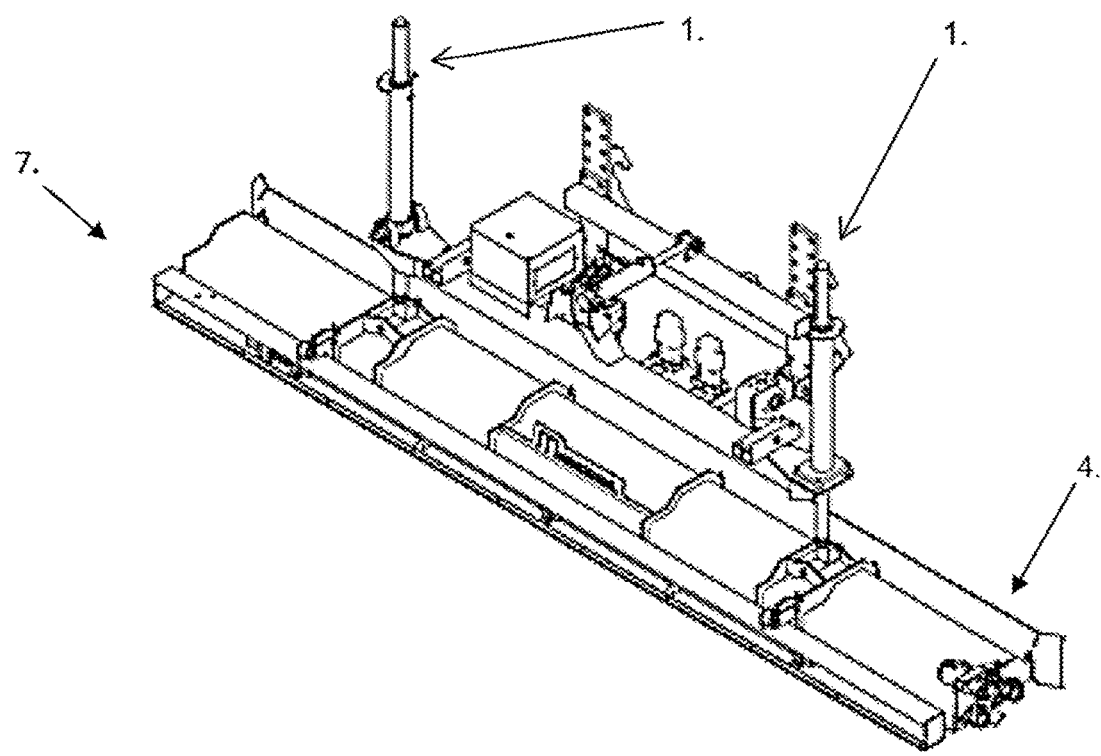
FIG. 1 illustrates a perspective view of the accessory.
Figure 2:
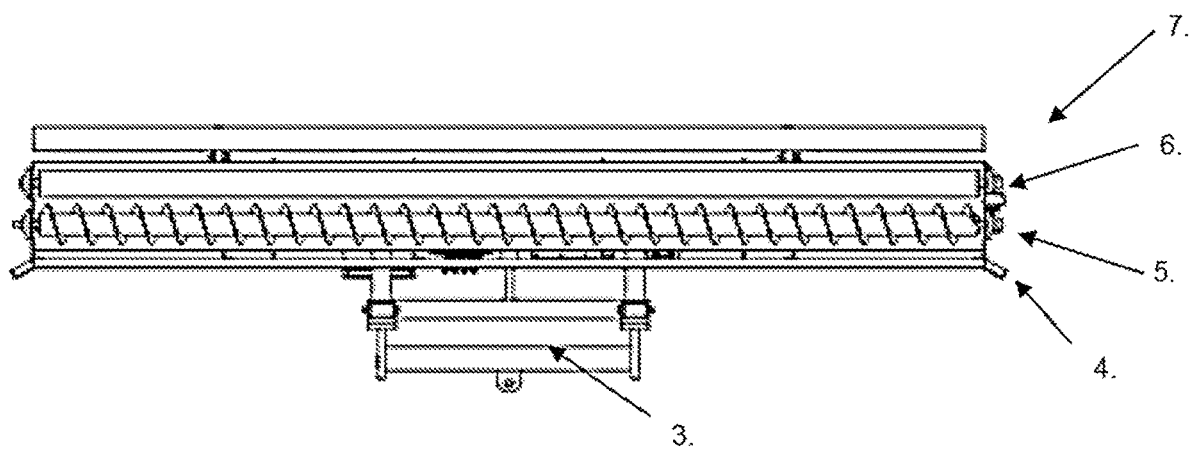
FIG. 2 illustrates an underside view of the working head (which makes contact with screed)
Figure 3A:
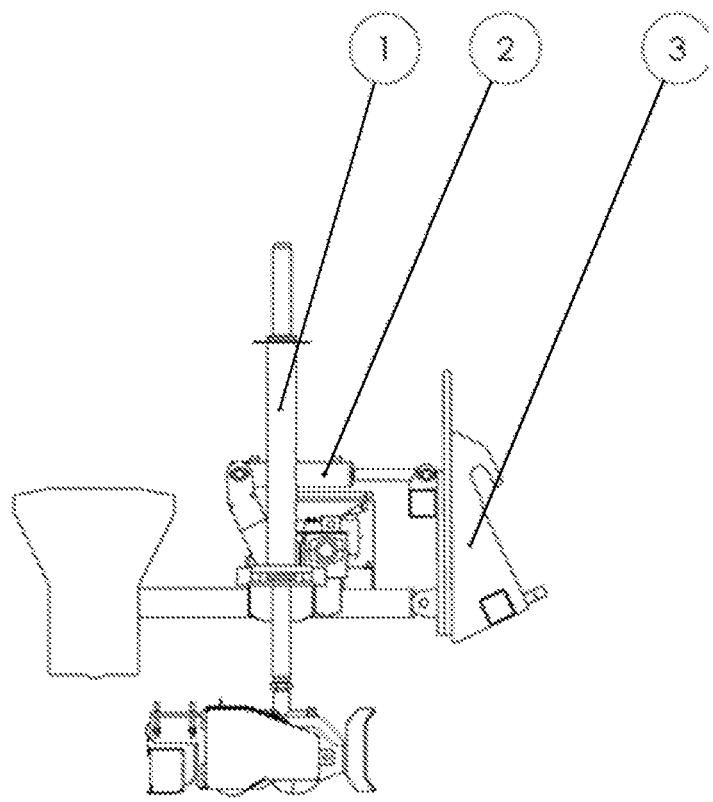
FIGS. 3a and 3b show side elevations of the working head.
Figure 3B:
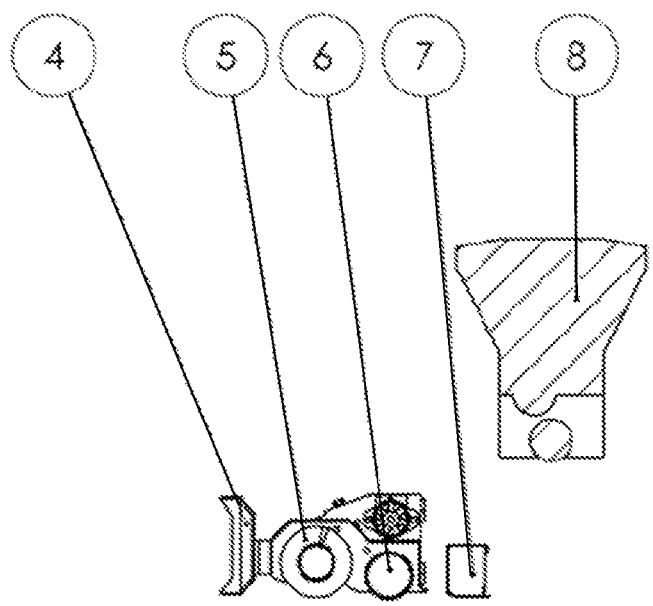
Figure 4:
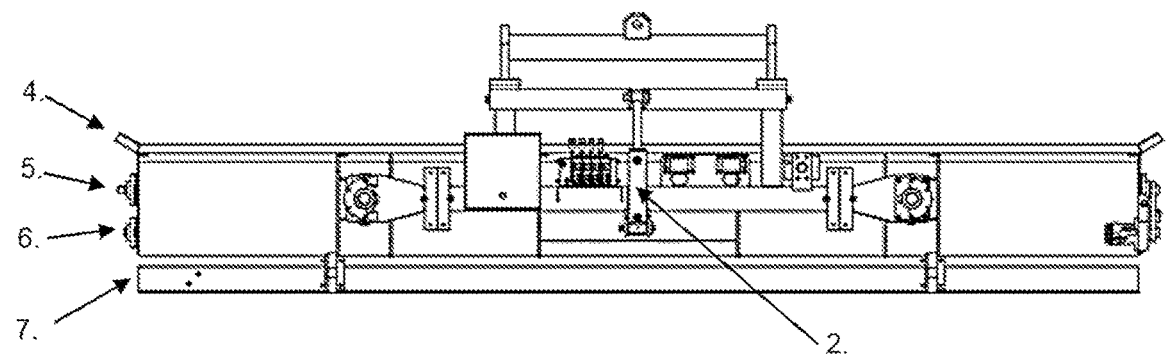
FIG. 4 shows a top view of the accessory.
Figure 5:
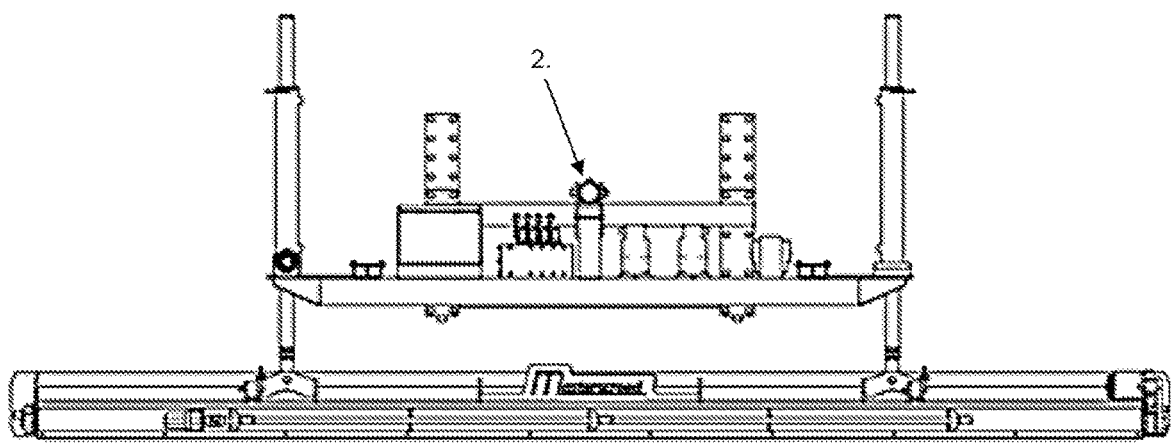
FIG. 5 shows a front elevation of the accessory.
Figure 6:
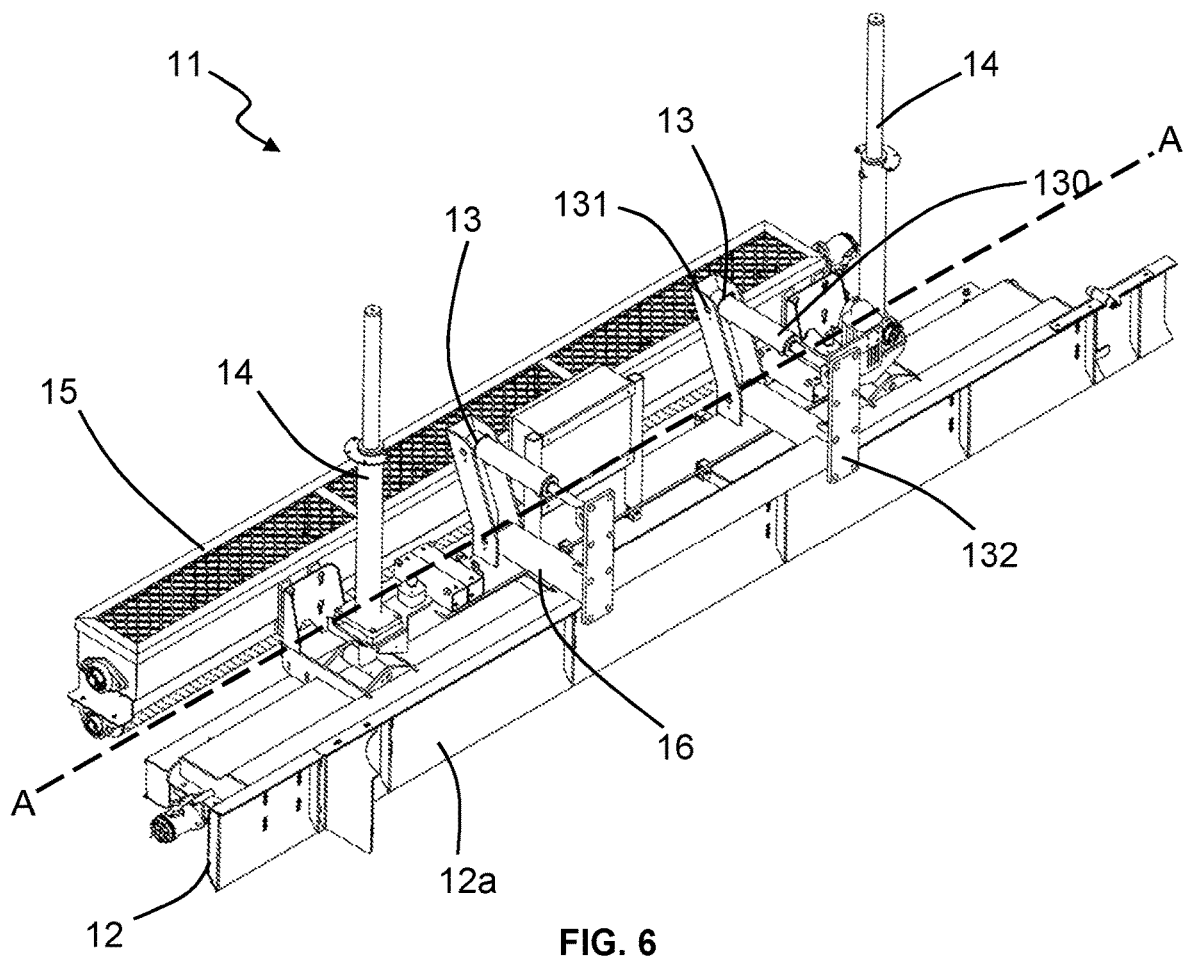
FIG. 6 illustrates a perspective view of a removable screed head according to another example.
Figure 7:
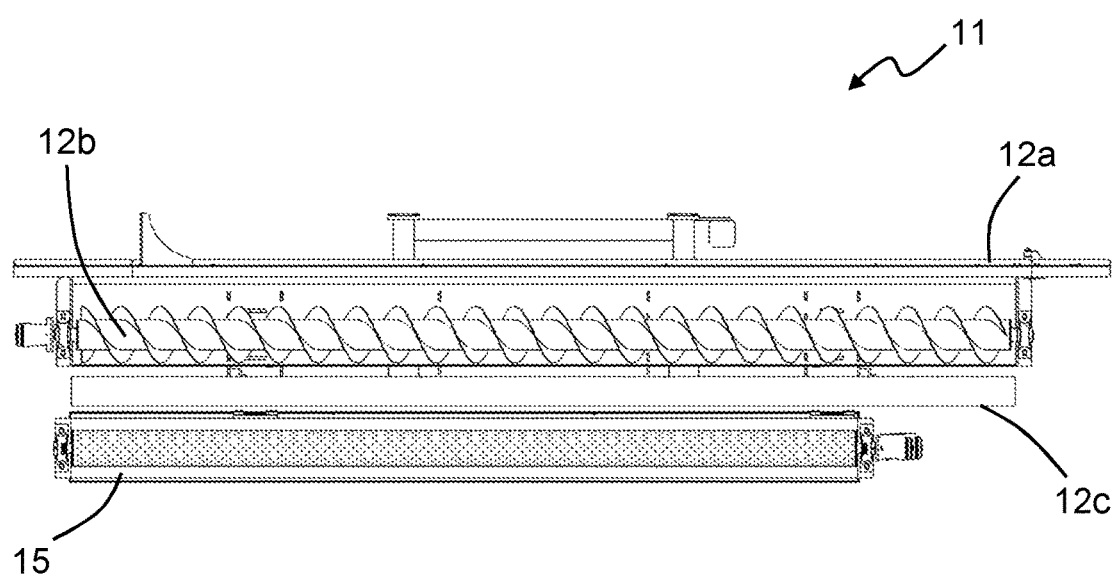
FIG. 7 illustrates an underside view of the removable screed head shown in FIG. 6.
Figure 8:
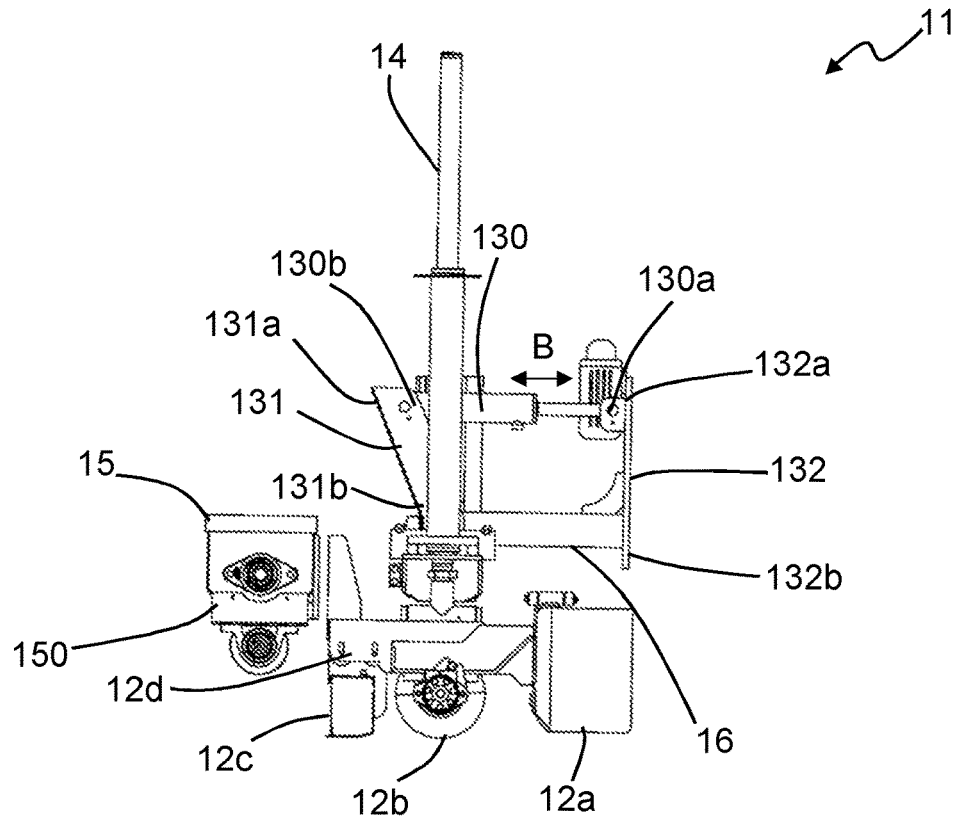
FIG. 8 illustrates a side view of the removable screed head show in FIG. 6 taken from a first side.
Figure 9:
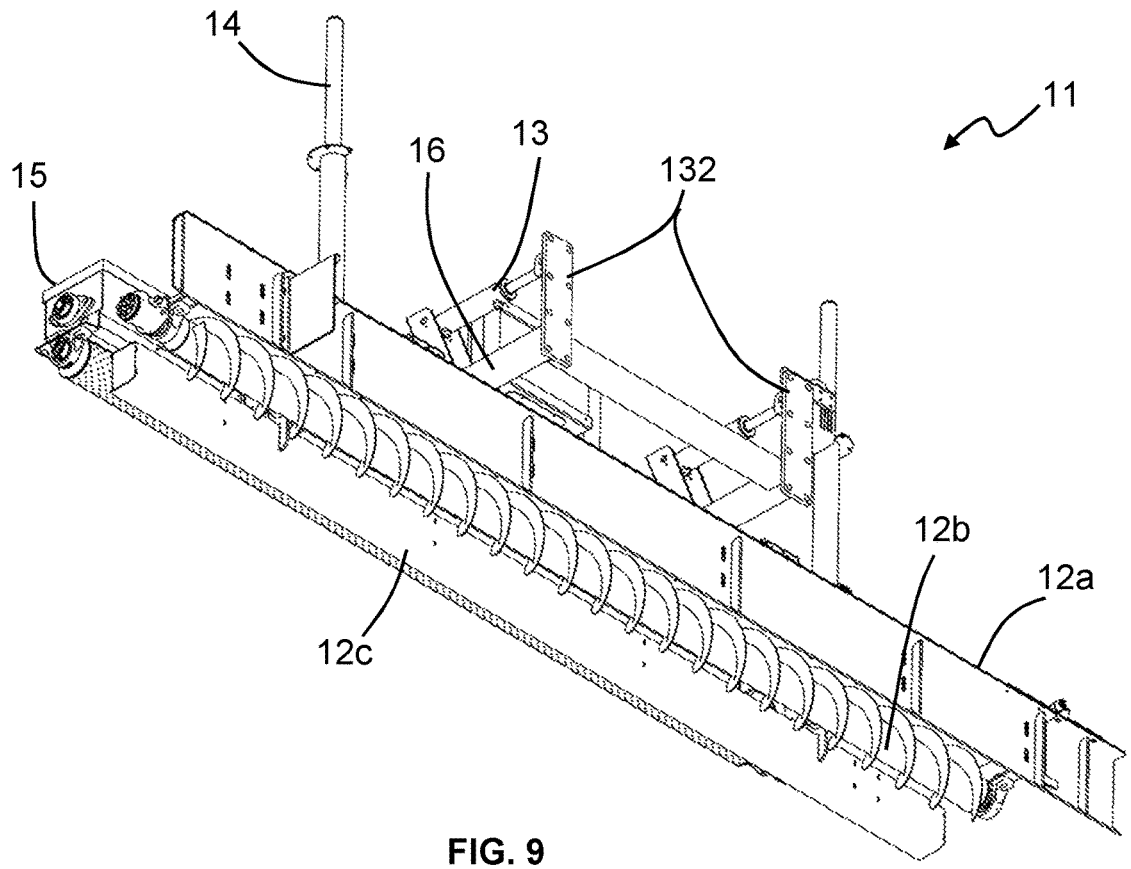
FIG. 9 illustrates a perspective view of the underside of the removable screed head shown in FIG. 6.
Figure 10:
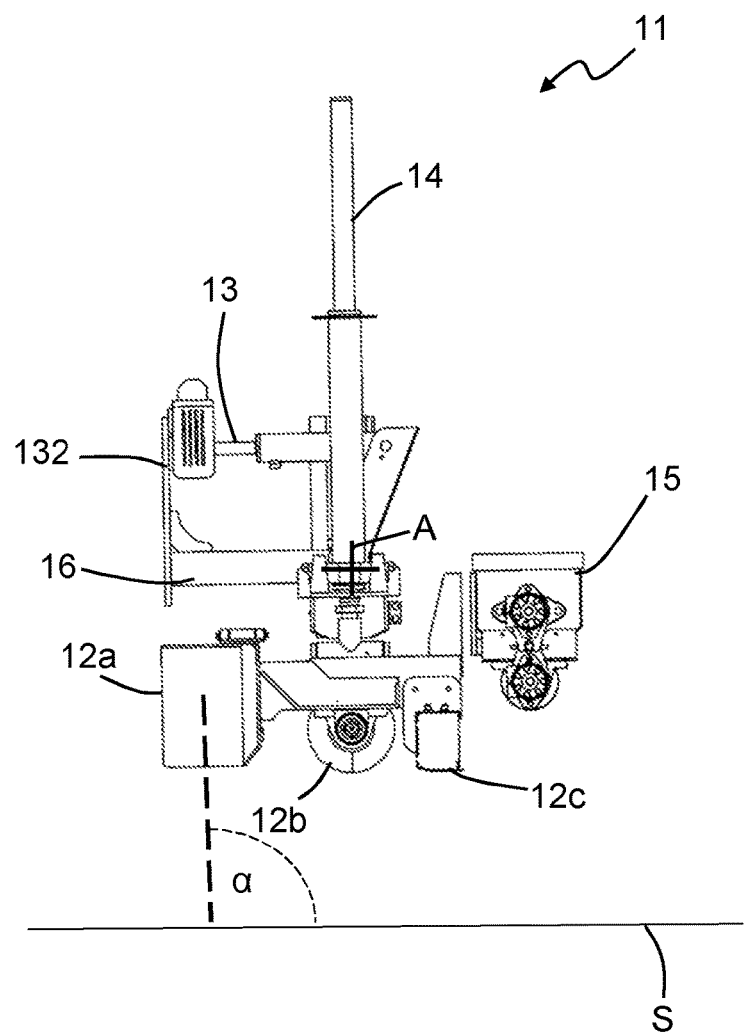
FIG. 10 illustrates a side view of the removable screed head shown in FIG. 6 taken from a second side.
Figure 11:
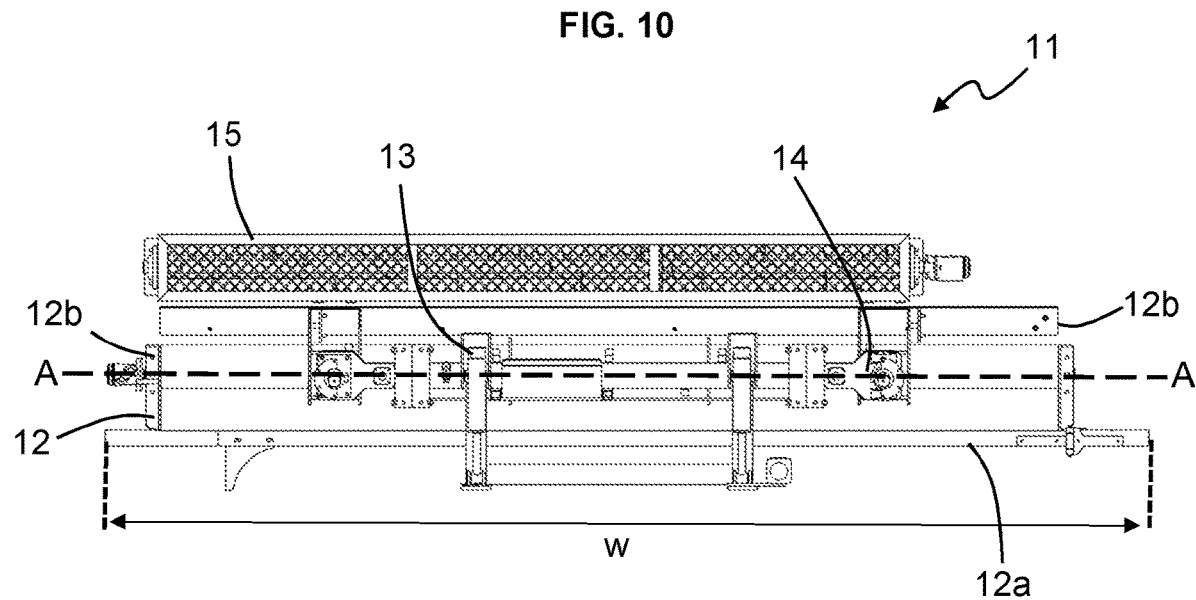
FIG. 11 illustrates a plan view of the removable screed head shown in FIG. 6.
Figure 12:
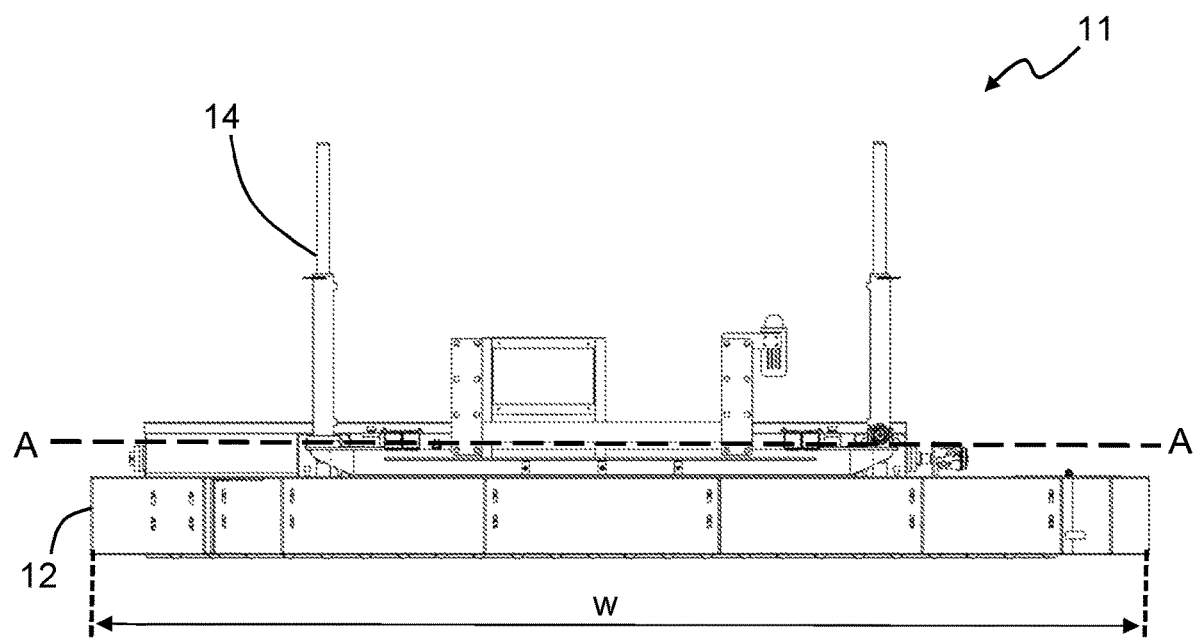
FIG. 12 illustrates a rear view of the removable screed head shown in FIG. 6.

The accessory kit would be equipped with a secure universal linkage or coupling component able to couple fixedly with most general-purpose vehicles and tractors and telehandlers equipped or not equipped with a telescopic boom. This coupling component would be designed to be hooked to the controlling armature of general-purpose vehicles. It may be equipped with bolt holes, lugs and or hinged latches to ensure rigid fixing to a telescopic boom.

Normally, immediately following any screed levelling operation, a hardening compound is added by hand. The present invention provides for a tank with suitable pipes and taps for the automatic application of this hardening compound during the levelling operation.

A further refinement relates to the positioning of the working head where traditional machines exert control of the horizontal setting with adjusters built into the body of the screed head, but the present invention fulfils this function with a single centrally mounted Slope Cylinder that sits atop of the frame of the accessory being therefore separate from the working head.

The accessory as described offers a major reduction in capital investment with a negligible increase in the labour requirement by comparison to the cost of the complete four wheeled levelling equipment.

As shown in FIGS. 1 to 5, the present invention provides an Accessory Kit possessing the main elements of a screed head as seen on traditional concrete levelling equipment with the addition of a Roller 6, a Coupling Component 3, a Sprinkler System 8 for the application of concrete hardening compound and a novel Slope Cylinder 2 for the more immediate and accurate control of the screed head to continuously maintain a working angle of 90 degrees to the horizontal according to data supplied by laser receivers. The accessory also includes two levelling cylinders 1, a blade 4, an auger 5 and a vibrator 7.

The coupling component 3 is arranged for detachably coupling fixedly to a telescopic boom of a general-purpose vehicle. The slope cylinder 2 is positioned on the screed head main body such that only the main housing for the auger 5, blade 4, roller 6 and vibrator 7 is moved by the slope cylinder 2. The frame section of the accessory remains immovable in relation to the vehicle's boom.

The coupling component 3 includes bolt holes in a multiplicity of places for added rigidity of the link with the vehicle armature. The coupling component 3 may also include side-facing and forward-facing lugs with holes for the fixing of bolts in a variety of places to gain added rigidity to the connection between the levelling accessory and the vehicle armature. The coupling component 3 may be equipped with a hand operated hinged latch with a hook able to be snapped in place in a single movement so as to pinch together the component and the edge of, any or all sides or places on the periphery of, the end of the vehicle's armature so as to increase the rigidity of the connection.

The invention is not limited to the examples illustrated in FIGS. 1 to 5, but can be varied within the scope of the accompanying claims.

Referring now to FIGS. 6 to 12, there is a removable screed head 11 according to another example.

The removable screed head 11 may comprise levelling components 12. The removable screed head 11 may comprise an angle adjustment mechanism 13. The removable screed head 11 may comprise an elevation or height or vertical adjustment mechanism 14. The removable screed head 11 may comprise a sprinkler system 15. The accessory or screed head 11 may comprise one or more attachments (for example as shown in the FIG. 1 example), for removably attaching or securing the removable screed head 11 to a telescopic boom of a general-purpose vehicle.

The levelling components 12 may comprise one or more of a blade 12a, an auger 12b, a vibrator 12c and a roller (as shown in the FIG. 1 example). The levelling blade 12a may have a width w (viewed in front), which may be a or the major dimension of the levelling components 12 and/or the levelling blade 12a. The levelling components 12 may be at least partially contained or retained in a housing 12d.

The removable screed head 11 may comprise a support structure 16, which may comprise or be a frame 16. The levelling components 12 may be pivotally attached to the support structure 16, so as to be pivotal about a horizontal axis A relative to the support structure 16. The or each attachment may be attached to the support structure 16.

The angle adjustment mechanism 13 may be configured or configurable to alter, in use, the angle α (shown in FIG. 10) of the levelling components 12 about the horizontal axis A. The horizontal axis A may be substantially parallel (e.g. parallel) to the width w of the levelling blade 12a as viewed in front. The angle adjustment mechanism 13 may be configured or configurable to alter the angle of the levelling components 12 (e.g. the levelling blade 12a) relative to the or each attachment, for example such that the levelling components 12 have (e.g. the levelling blade 12a has) a working angle which is a substantially perpendicular angle α (e.g. a ninety-degree angle) relative to a surface S over which the removable screed head 11 is or the levelling components 12 are located in use.

The angle adjustment mechanism 13 may comprise a first end attached or coupled (for example directly or indirectly) to the attachment. The angle adjustment mechanism 13 may comprise a second end attached (for example directly or indirectly) to the levelling components 12. The angle adjustment mechanism 13 may be operable or actuatable to alter the angle α of the levelling components 12 (e.g. the levelling blade 12a) relative to the attachment, whilst the angle of the attachment relative to a surface S over which the removable screed head 11 is located remains substantially unaltered.

The angle adjustment mechanism 13 may comprise one or more slope cylinders 130. The or each slope cylinder 130 may be a hydraulic or pneumatic cylinder. The angle adjustment mechanism 13 may comprise one or more link or linkage members 13b. The or each link or linkage member 131 may comprise first and second (e.g. opposed) ends 131a, 131b. The or each link or linkage member 131 may be attached (e.g. hingedly) at or adjacent its first end 131a to a or the slope cylinder 130. The or each link or linkage member 131 may be attached (e.g. non-hingedly) at or adjacent its second end 131b to the levelling components 12, e.g. to or via the housing 12d. The second end 131b of the or each link or linkage member 131 may be attached (e.g. hingedly) to the frame 16.

The angle adjustment mechanism 13 may comprise one or more upright members 132. The or each upright member 132 may be or comprise a fixed plate 132. The or each fixed plate 132 may have first and second (e.g. opposed) ends 132a, 132b. The or each fixed plate 132 may be connected at a first end 132a thereof to the slope cylinder 130. The or each fixed plate 132 may be secured or fixed (e.g. non-hingedly) at or adjacent its second end 132b to the to the frame 16. The or each slope cylinder 130 may comprise first and second (e.g. opposed) ends 130a, 13b. The first end 130a of the slope cylinder 130 may be hingedly connected to the fixed pate 132. The second end 130b of the slope cylinder 130 may be hingedly connected to the link or linkage member 131. The or each slope cylinder 130 may be extendable and/or retractable, in use, for example as indicated by arrows B (see FIG. 8).

Where only one slope cylinder 130 is provided it may be positioned substantially centrally along the width w of the blade 12a, as viewed in front. Where more than one slope cylinder 130 is provided they may be evenly spaced along the width w of the levelling blade 12a.

The angle adjustment mechanism 13 may comprise one or more monitoring devices for example for monitoring, in use, the level of a surface S over which the removable screed head 11 is located or moved. The or each monitoring device may comprise a laser or laser receiver. Monitoring the level of the surface S may comprise monitoring or measuring the angle (e.g. relative to vertical) of the surface S, e.g. at the location of the removable screed head 11 or the levelling components 12 thereof.

The removable screed head 11 may comprise a feedback system, for example configured or configurable to actuate the angle adjustment mechanism 13, (e.g. based on the monitored level of the surface S over or above which the removable screed head 11 is located). Actuation of the angle adjustment mechanism 13 may thereby adjust the angle α of the levelling components 12 into (or maintain the levelling components 12 at) a substantially perpendicular angle α to said surface S.

The elevation or height or vertical adjustment mechanism 14 may be for adjusting the height of the levelling components 12 (e.g. in use) over a surface S to be levelled (e.g. an uncured concrete surface to be levelled). The elevation or height or vertical adjustment mechanism 14 may comprise height adjustment cylinders 140.

The sprinkler system 15 may comprise a trough 150 for holding a hardening compound. The sprinkler system 15 may be configured or configurable to release (e.g. in a controlled manner) some of the hardening compound, e.g. in use. The sprinkler system 15 may be configured or configurable to release (e.g. in a controlled manner) a metered or controlled amount of hardening compound from the trough 150, e.g. in use.

The or each attachment may be configured to removably attach the removable screed head 11 to a boom of a general-purpose vehicle. The or each attachment may comprise a quick release mechanism (e.g. such that the removable screed head 11 may be rapidly removed or removable from a or the boom of a general-purpose vehicle). The or each attachment may comprise one or more latches. The or each attachment or the or each latch may comprise one or more hooks. The or each attachment may be fixed or secured to the or each fixing plate 132 (e.g. upright member 132).

The removable screed head 11 may comprise a control system. The control system may be configured or configurable to control one or more of the angle adjustment mechanism 13 (e.g. the or each slope cylinder 130), the elevation or height or vertical adjustment mechanism 14 and/or the sprinkler system 15. The control system may be located (at least in part) on or adjacent the removable screed head 11. The control system may be located (at least in part) spaced from the removable screed head 11.

Figure 13:
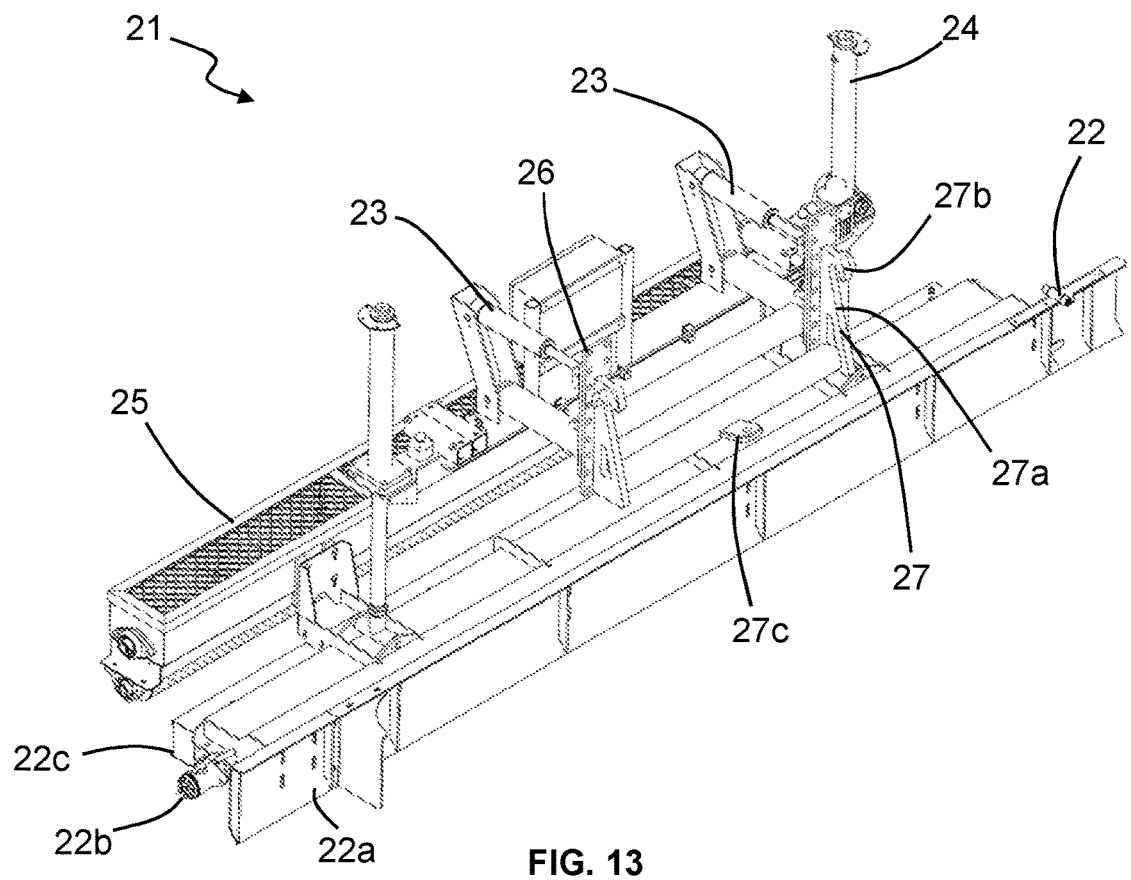
FIG. 13 illustrates a perspective view of a removable screed head according to another example.

Referring now to FIG. 13, there is shown a removable screed head 21 according to another example. The removable screed head 21 may comprise levelling components 22 (for example comprising one or more of a levelling blade 22a, a levelling auger 22b and a levelling vibrator 22c), an angle adjustment mechanism 23, an elevation or height or vertical adjustment mechanism 24 and/or a sprinkler system 25. The removable screed head 21 may comprise one or more attachments 27, for example which may comprise one or more latches 27a. The or each attachment may be secured or fixed to a fixed plate 26 of the angle adjustment mechanism 23. The or each latch 27a may comprise a hook 27b. The attachment 27 may comprise an abutment 27c, for example which may comprise a projection. The projection may comprise a plate. The abutment 27c may have an aperture, for example through its thickness. The abutment 27c and/or aperture may be configured to receive (e.g. in a locking fashion) a projection of a general-purpose vehicle or a telescopic boom thereof. Where there are plural hooks 27b they may be aligned with one another, e.g. co-aligned (for example configured to receive a bar or beam of a general-purpose vehicle and/or a telescopic boom thereof).

Figure 14:
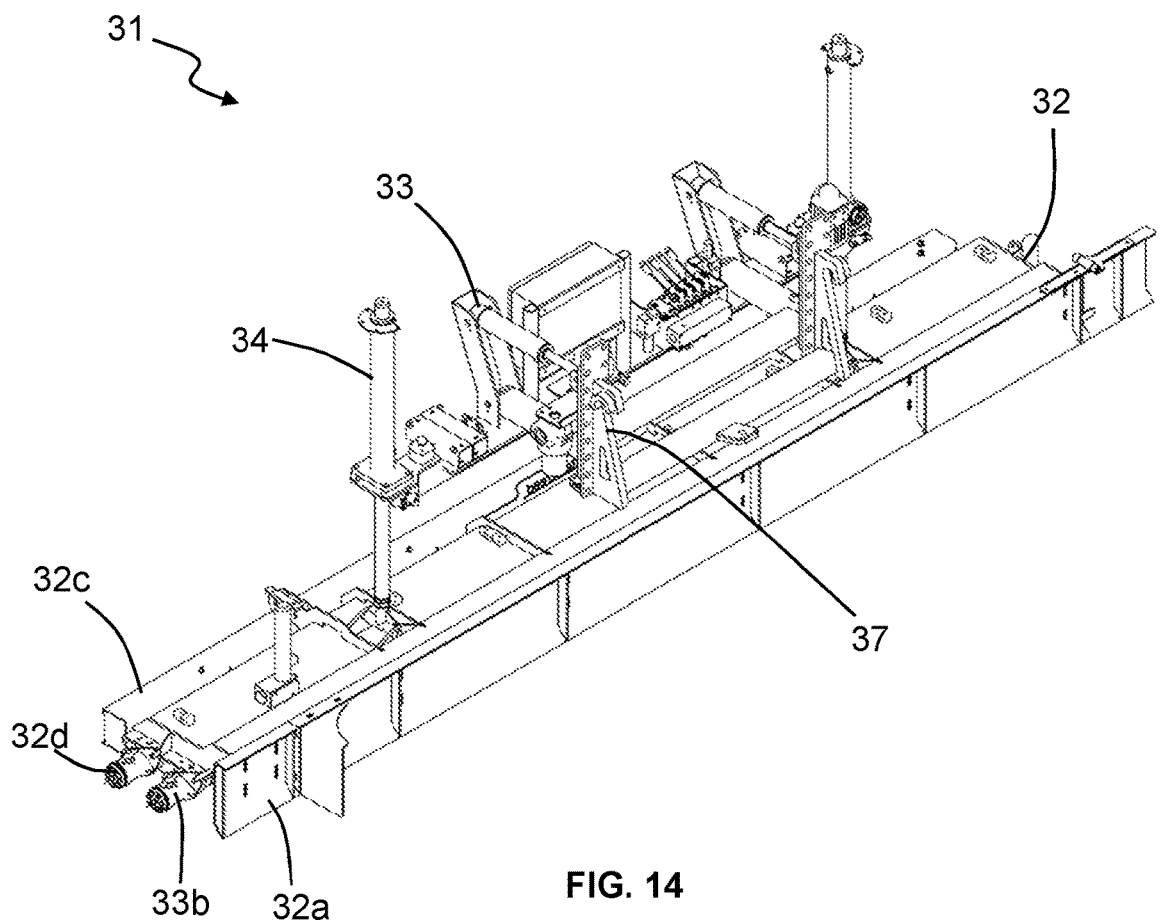
FIG. 14 illustrates a perspective view of a removable screed head according to another example.

Referring now to FIG. 14, there is shown a removable screed head 31 according to another example. The removable screed head 31 show in FIG. 14 differs from the removable screed head 21 shown in FIG. 13 in that the levelling components 32 further comprise a roller 32d and that a sprinkler system is not provided.

Figure 16:
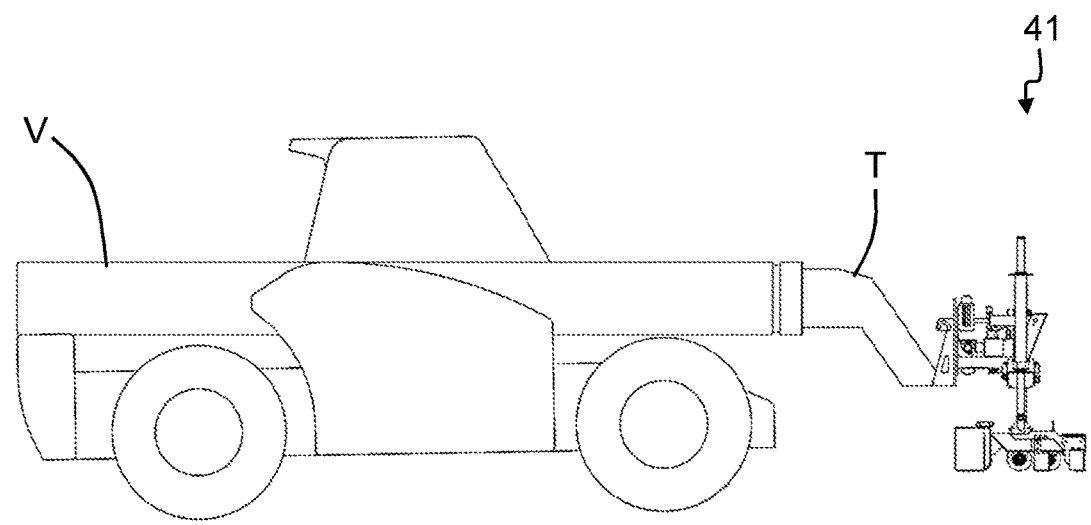
FIG. 16 illustrates a side view of the removable screed head attached to the general-purpose vehicle shown in FIG. 15.
Figure 15:
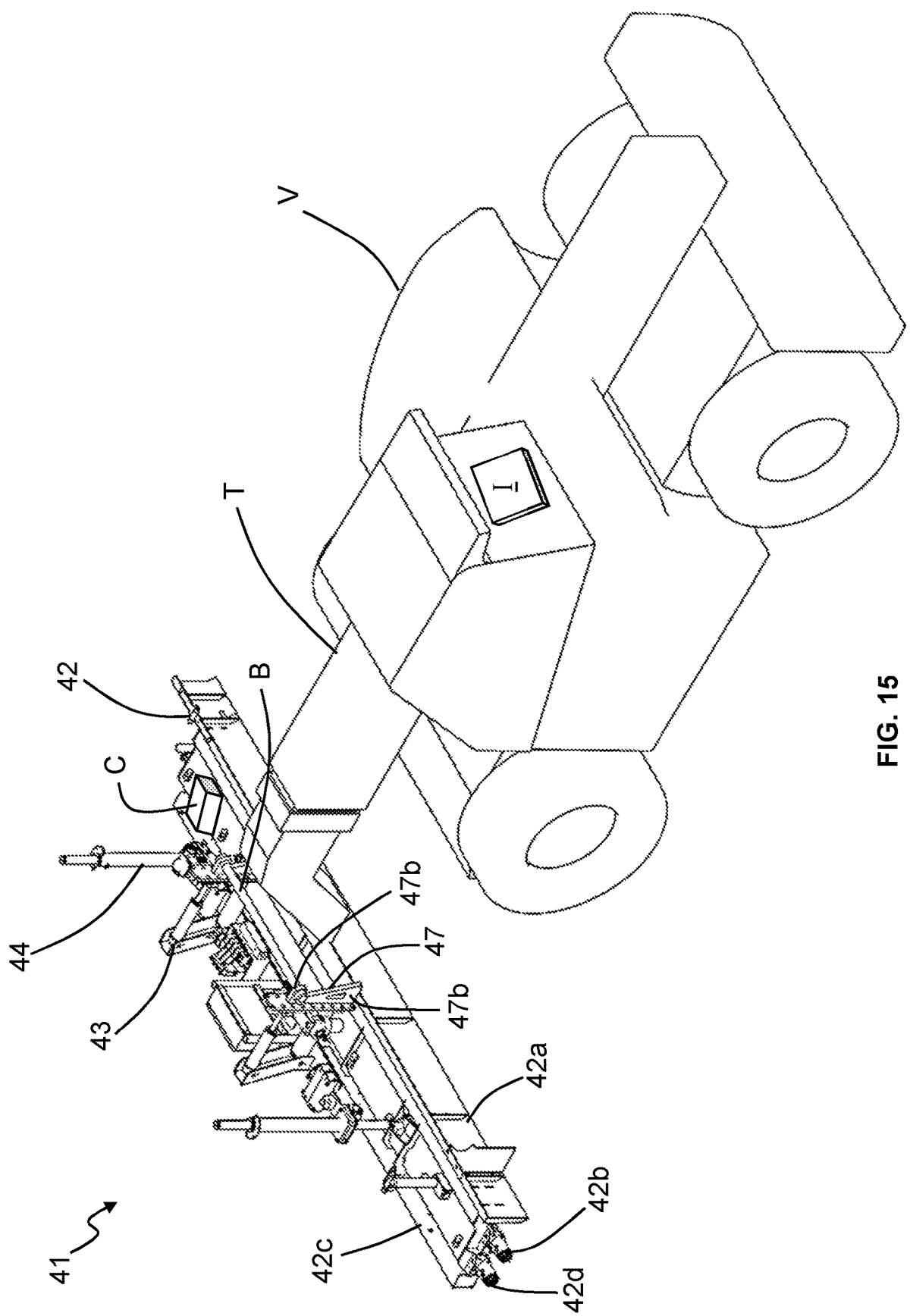
FIG. 15 illustrates a perspective view of a removable screed head according to an example attached to a general-purpose vehicle.

Referring now to FIGS. 15 and 16, there is shown a removable screed head 41 attached to the telescopic boom T of a general-purpose vehicle V. The screed head 41 comprises levelling components 42 (e.g. a blade 42a, an auger 42b, a vibrator 42c and/or a roller 42d), an angle adjustment mechanism 43, an elevation or height or vertical adjustment mechanism 44 and one or more attachments 47 which comprises one or more latches 47a. Each latch 47a comprises a hook 47b. The hooks 47b are attached (removably) to a bar B of the telescopic boom T.

The screed head 41 also includes a stand-alone controller C for controlling the operation of the screed head 41 independently of the vehicle V to which it is connected. In this respect, an input device I, a so-called Human Machine Interface (HMI), is provided which communicates with the controller C. In this example, the input device I communicates wirelessly with the controller C, but it is also envisaged that this may be achieved through a wired connection.

In use, the removable screed head 41 may be attached (e.g. removably) to the telescopic boom T of a general-purpose vehicle V using the one or more attachments 47. The removable screed head 41 may then be moved over a surface to be levelled, for example by extending and/or retracting the telescopic boom T and/or by moving the general-purpose vehicle V. The levelling components 42 may be continuously or selectively operated to level a surface thereunder.

It will be appreciated by those skilled in the art that the removable screed head 41 may be installed on a vehicle or machine without a telescopic boom, for example a tractor, skid loader or skid steer. In such examples, the removable screed head 41 could be moved along the surface as the vehicle V moves, rather than via movement of the boom.

For the avoidance of doubt, any of the features described herein apply equally to any aspect of the disclosure.

Within the scope of this application it is expressly envisaged that the various aspects, embodiments, examples and alternatives set out in the preceding paragraphs, in the claims and/or in the description and drawings, and in particular the individual features thereof, may be taken independently or in any combination. Features described in connection with one aspect, example or embodiment are applicable to all aspects, examples or embodiments, unless such features are incompatible. It will also be appreciated by those skilled in the art that any number of combinations of the aforementioned features and/or those shown in the appended drawings provide clear advantages over the prior art and are therefore within the scope of the present disclosure.

The invention claimed is:

1. A removable screed head for levelling uncured concrete, the removable screed head having a levelling blade and an attachment configured to removably attach the removable screed head to a boom of a general-purpose vehicle, the screed head further comprising a stand-alone controller disposed on the removable screed head for controlling, in use, operation of the screed head, independently of the vehicle to which the removable screed head is connected.

2. Removable screed head according to claim 1, comprising levelling components including one or more of an auger, a vibrator and a roller.

3. Removable screed head according to claim 1, wherein the attachment comprises a quick release mechanism.

4. Removable screed head according to claim 1, wherein the levelling blade has a width, the removable screed head comprising an angle adjustment mechanism configured or configurable to alter, in use, the angle of the levelling blade about a horizontal axis substantially parallel to the width of the levelling blade.

5. Removable screed head according to claim 4, wherein the angle adjustment mechanism is configured or configurable to alter the angle of the levelling blade relative to the attachment, such that a working angle of the levelling blade is substantially perpendicular to a surface over which the removable screed head is located.

6. Removable screed head according to claim 4, wherein the angle adjustment mechanism comprises a first end attached to the attachment and a second end attached to the levelling blade.

7. Removable screed head according to claim 4, wherein the angle adjustment mechanism is arranged such that actuation thereof alters the angle of the levelling blade relative to the attachment to maintain the working angle substantially constant.

8. Removable screed head according to claim 4, wherein the angle adjustment mechanism comprises one or more slope cylinders.

9. Removable screed head according to claim 8, comprising a single slope cylinder which is centrally positioned along the width of the levelling blade.

10. Removable screed head according to claim 4, comprising:
   a monitoring device for monitoring, in use, the level of a surface over which the removable screed head is located; and
   a feedback system configured or configurable to actuate the angle adjustment mechanism based on the monitored level of the surface over which the removable screed head is located, to thereby adjust the angle of the levelling blade into or to maintain the levelling blade at a substantially perpendicular angle to said surface.

11. Removable screed head according to claim 10, wherein the monitoring device comprises one or more lasers.

12. Removable screed head according to claim 4, comprising a vertical adjustment mechanism for adjusting the height of the levelling blade, in use, over an uncured concrete surface to be levelled.

13. Removable screed head according to claim 12, wherein the vertical adjustment mechanism comprises height adjustment cylinders.

14. Removable screed head according to claim 1, wherein the attachment comprises one or more latches.

15. Removable screed head according to claim 14, wherein the or each latch comprises one or more hooks, the or each hook configured to be manually engageable with a cooperating projection or beam on a boom of a general-purpose vehicle.

16. Removable screed head according to claim 14, wherein at least one or each latch comprises an aperture through its thickness for receipt of a pin, bolt or other elongate securement to thereby removably secure the removable screed head to a boom of a general-purpose vehicle.

17. Removable screed head according to claim 4, comprising one or more quick connect couplings for connecting the accessory to hydraulic, pneumatic and/or electrical supplies.

18. Removable screed head according to claim 17, comprising an input device for use in the cabin of the vehicle to which it is connected, wherein the input device is connected or connectable to the stand-alone controller by a wired or wireless connection.

19. A removable screed head for levelling uncured concrete, the removable screed head comprising:
- a levelling blade having a width;
- an angle adjustment mechanism operable to alter the angle of the levelling blade about a horizontal axis substantially parallel to the width of the levelling blade;
- an attachment configured to removably attach the removable screed head to a boom of a general-purpose vehicle;
- one or more quick connect couplings for connecting the removable screed head to hydraulic, pneumatic and/or electrical supplies;
- a stand-alone controller disposed on the removable screed head for controlling the operation of the removable screed head independently of the vehicle to which it is connected; and
- an input device for use in the cabin of the vehicle to which it is connected, wherein the input device is connected or connectable to the stand-alone controller by a wired or wireless connection.

20. A removable screed head for levelling uncured concrete, the removable screed head comprising:
- a levelling blade having a width;
- levelling components including one or more of an auger, a vibrator and a roller;
- a vertical adjustment mechanism for adjusting the height of at least the levelling blade over an uncured concrete surface to be levelled;
- one or more slope cylinders operable to alter the angle of at least the levelling blade about a horizontal axis substantially parallel to the width of the levelling blade;
- a monitoring device for monitoring the level of a surface over which the removable screed head is located;
- a feedback system operable to actuate the angle adjustment mechanism based on the monitored level of the surface over which the removable screed head is located, to thereby adjust the angle of the levelling blade into or to maintain the levelling blade at a predetermined angle to said surface
- a quick release mechanism configured to removably attach the removable screed head to a boom of a general-purpose vehicle;
- one or more quick connect couplings for connecting the removable screed head to hydraulic, pneumatic and/or electrical supplies;
- a stand-alone controller disposed on the removable screed head for controlling the operation of the removable screed head independently of the vehicle to which it is connected; and
- an input device for use in the cabin of the vehicle to which it is connected, wherein the input device is connected or connectable to the stand-alone controller by a wired or wireless connection.

\* \* \* \* \*